Dec. 8, 1964　　　　　H. MAROHN　　　　　3,160,313
FEEDING DEVICE ON MACHINE TOOLS FOR PROCESSING BLANKS
Filed May 28, 1963　　　　　　　　　　　　　　　2 Sheets-Sheet 1
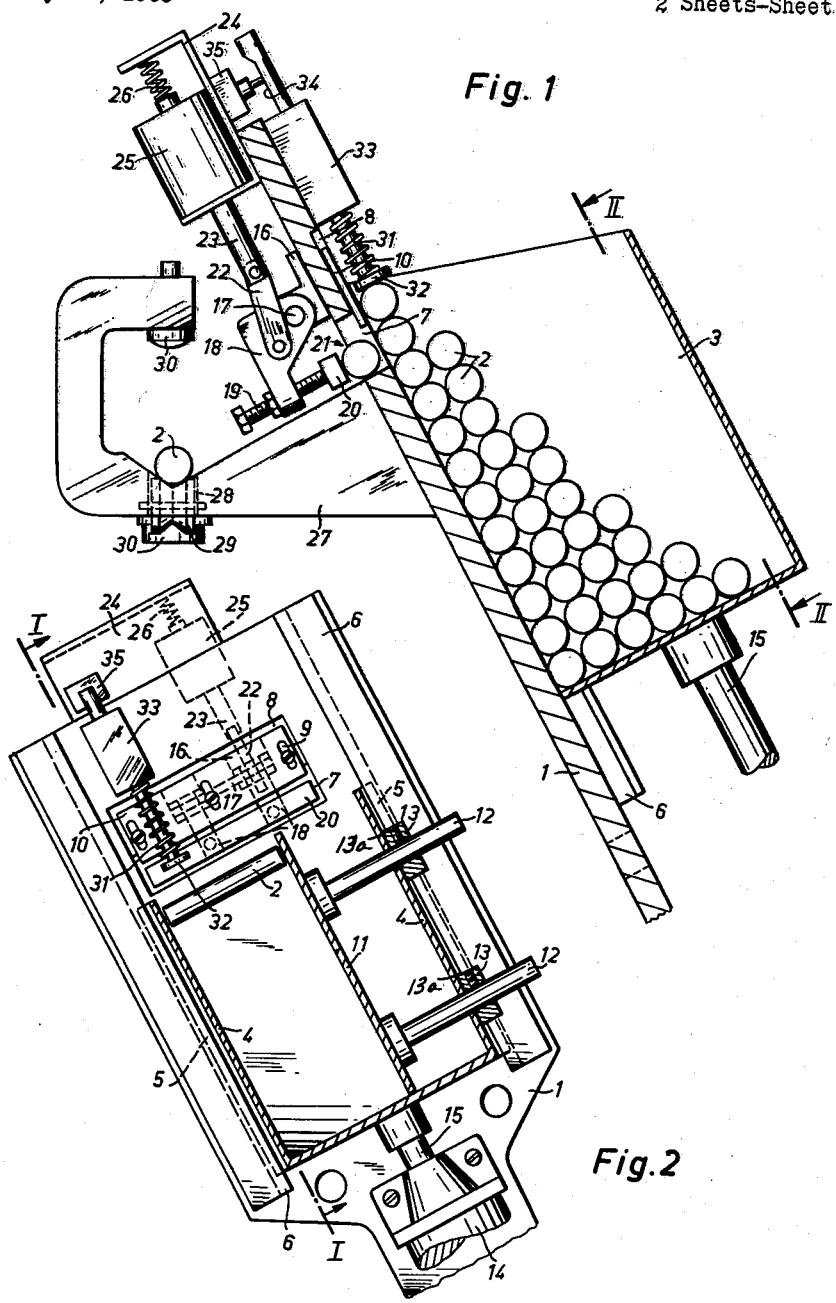
INVENTOR.
HERBERT MAROHN
BY Robert H. Jacob
AGT Dec. 8, 1964     H. MAROHN     3,160,313
FEEDING DEVICE ON MACHINE TOOLS FOR PROCESSING BLANKS
Filed May 28, 1963     2 Sheets-Sheet 2

INVENTOR.
Herbert MAROHN
BY
Robert Jacob.
AGT.

United States Patent Office 3,160,313
Patented Dec. 8, 1964

3,160,313
FEEDING DEVICE ON MACHINE TOOLS FOR PROCESSING BLANKS
Herbert Marohn, Kaiserslautern, Pfalz, Germany, assignor to G. M. Pfaff A.G., Kaiserslautern, Pfalz, Germany
Filed May 28, 1963, Ser. No. 283,869
Claims priority, application Germany, June 6, 1962, P 29,564
2 Claims. (Cl. 221—9)

The invention relates to blank feeding devices for tool machines. More in particular the invention is concerned with a device for feeding blanks to tool machines for processing where the blanks are of generally cylindrical shape and a storage container which releases a work blank for each operating cycle.

In accordance with the invention the feeding device is to be constructed in a manner that during removal from the supply container the work blank is practically free of any pressure and that the stacked work blanks during the discharge operation are not subjected to any displacement relative to each other. In accordance with the invention this is accomplished in that the supply container is slidably adjustable in height and is disposed against a plate which is inclined with respect to vertical position, and which constitutes one longitudinal wall of the supply container and presents at the upper end of the path of movement of the container a discharge aperture which permits passage of one work blank at a time.

In devices which feed work blanks to tool machines of the type generally known as single purpose machines, it is necessary that the changeover from one size of work blank to another can be effected relatively rapidly and without exchanging of parts of the feeding device. This is accomplished in accordance with a further object of the invention in that a flap is pivotally mounted along the side of the plate that is remote from the supply container and an abutment is provided which, together with the discharge aperture, forms a supply chamber for one work blank at a time, the storage volume of which can be varied.

Figure 3:
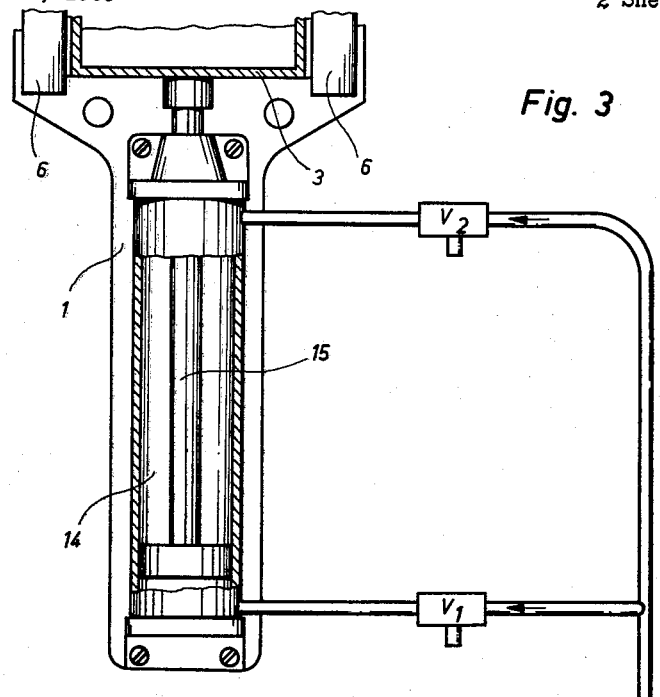
Figure 4:
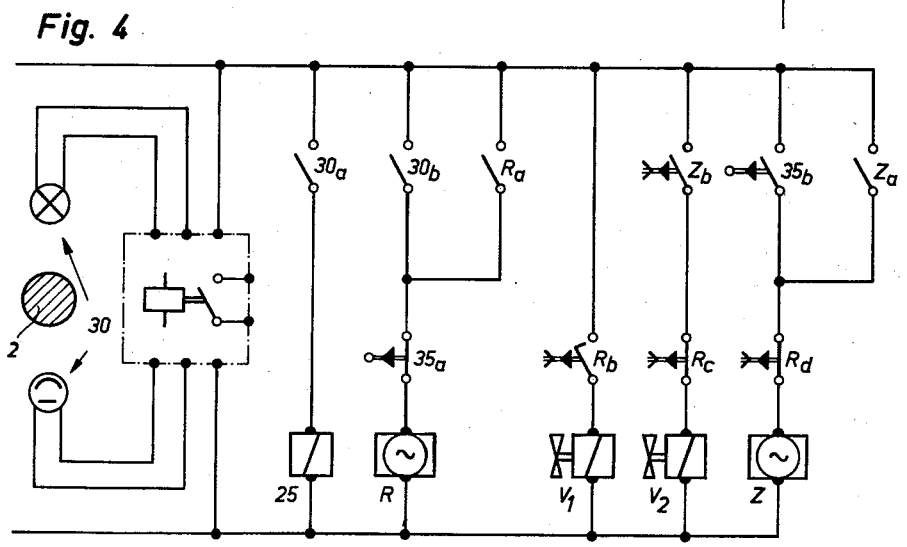

Further objects, advantages, and details of the invention will become apparent from the following specification with reference to the drawings which illustrate one embodiment of the invention and in which:

FIG. 1 is a cross-sectional side view of the device taken essentially along line I—I in FIG. 2, FIG. 2 is a front view of the device partly in section taken along line II—II in FIG. 1, FIG. 3 is a sectional view of a hydraulically operated cylinder with control valves for operating the device in accordance with the invention, and FIG. 4 is a schematic diagram showing the control assembly for the hydraulic cylinder.

The inclined plate 1 serves as a carrier for a container 3 in which the work blanks 2 are stored and the level of which is adjustable along this plate. The side walls of the container are provided with guiding slides 5 as seen in FIG. 2 which slide in a guide way 6. The plate 1 forms at the same time one wall of the container 3 and is provided proximate the end of the path of movement of the filled container with a discharge aperture 7 for the work blanks 2. Above this discharge aperture a recess 8 is provided in the plate in which a slide member 10 is arranged which is provided with slots 9. This member is employed for adapting the size of the discharge aperture to the different work blank diameters. In order to make it possible to adapt the width of the container to the length of the work blanks the container is provided with a slidable center wall 11 having two guide studs 12 which slide in eyelets 13 in one of the side walls 4. Set screws 13a are provided to secure the studs 12 in position. In the embodiment of the invention illustrated a pneumatically or hydraulically operated cylinder 14 is arranged on plate 1 for raising and lowering the container 3 which has a pressure piston 15 that is connected with the bottom of the container 3. The upward movement of the container is controlled by an electro valve V1 (not illustrated) while the downward movement is controlled by an electro valve V2 (not illustrated) in a manner to be described hereinafter.

Two support members 16 are provided on the side of the plate 1 remote from the container and above the discharge aperture 7 in which two lugs 18 are pivotally mounted which are connected with each other by means of a shaft 17. Each of the lugs 18 is provided with a set screw 19 and these screws together carry an abutment 20 which forms a storage chamber 21 with the discharge aperture 7 for a single work blank that is variable as to storage volume. A connecting bar 22 is linked to one of the two lugs which at its free end is connected with the draw bar 23 of an electromagnet 25 mounted upon a supporting bracket 24. The supporting bracket 24 is secured to the plate 1 and offset at a right angle at its upper end. A pressure spring 26 is mounted between the draw bar 23 of the electromagnet 25 and the bottom of the supporting bracket, which serves for returning the lugs 18 to their normal position.

Furthermore a support member 27 is provided on the plate 1 which has recesses 28 at predetermined distances in which prism rollers 29 are mounted which forward the work blanks discharged from the storage space 21 in axial direction. The support member 27 is provided with a photocell 30 which constitutes a light gate and which passes its impulses to the electromagnet 25.

Along the side of the plate which faces the container and ahead of the discharge aperture 7 a plunger 32 is mounted which is spring loaded by means of a spring 31 and which slides in a guide member 33 mounted on the plate. The plunger 32 has a flattened side 34 at its upper end which cooperates with an end switch 35 mounted on the supporting bracket 24 for limiting the movement of the container 3.

The operation of the device is as follows: Let us assume that initially the container 3 is at the lowest position indicated in FIG. 2 and a work blank is located in the storage chamber 21. A further work blank rests upon the prism rollers 29 and interrupts the light ray of the photocell 30 as shown in FIG. 1 so that the electromagnet 25 is not energized.

When the last work blank passes the light gate the contact of the photocell 30 is closed by the uninterrupted light ray. The electromagnet 25 is supplied with current and raises the lugs 18 so that the work blank in the supply chamber 21 rolls onto the rollers 29 and is moved axially by the rollers. In this manner the light ray of the photocell is again interrupted, the electromagnet 25 is deprived of current and the lugs 18 are returned to their initial position by the spring 26.

Simultaneously with the operation of the electromagnet the closing of the contact of the photocell 30 opens the electro valve V1 by way of a time relay so that the container 3 is raised by the piston 15 until a work blank actuates the plunger 32. As a result the upward movement of the container is stopped by the end switch 35. During the upward movement of the container the work blank which is topmost while passing the discharge aperture 7 rolls as a result of the inclined position of the container into the supply chamber 27 that is defined by the aperture and the abutment 20 and remains in this chamber during the subsequent downward movement because the abutment 20 prevents further rolling of the work blank.

The downward movement of the container 3 is likewise initiated by the end switch 35 which when it is operated by the plunger 32 opens the electro valve V2 so that the container moves downwardly. The duration of the downward movement can be adjusted by a time switch so that, if the velocity of the downward movement is the same, the thrust of the downward movement of the uppermost blank resting against the plunger is always the same regardless of the level to which the container is filled. In this manner the container performs a Pilgrim step so that unnecessary movements are avoided.

The foregoing explanations as to operation and the hydraulic means and circuitry involved to operate the mechanism are illustrated in FIGS. 2 and 3. It is assumed that a work blank is located on prism rollers 29 and the light ray of the photocell 30 is interrupted. If this work blank leaves the photocell, the uninterrupted ray allows contact 30a to be closed so that current is supplied to electromagnet 25. This magnet then raises the lugs 18 which causes the work blank in the supply chamber 21 to roll onto prism rollers 29 and to be moved thereby in axial direction. As a result the light ray is again interrupted and contact 30a is opened so that the electromagnet 25 is de-energized, while lugs 18 are returned to their initial position by the spring 26. By closing the photocell 30 contact 30b is again closed, so that the retarding relay R is energized by way of closed contact 35a of the end switch 35. The self-holding contact Ra of relay R which is connected in parallel with contact 30b continues to receive current after release of contact 30b. By energizing the retarding relay R its contact Rb is closed while contacts Rc and Rd are released. As a result the electro valve $V_1$ is now supplied with potential and opens the path for the air pressure which moves the container 3 by way of piston 15 upwardly until a work blank actuates the plunger 32. Since contact 35a of the end switch 35 is now opened, the retarding relay R is deprived of current so that its contacts Ra and Rb are released while contacts Rc and Rd are closed. As contact Rb is released the current supply to electro valve $V_1$ is interrupted, so that the raising movement is terminated. By actuating the end switch 35 its contact 35b is simultaneously closed, so that the time switch Z is energized because contact Rd is likewise closed. A self-holding contact Za of the time switch Z is connected parallel to contact 35b so that although contact 35b is again released after having been actuated, the time switch Z remains energized. By applying potential to the time switch Z its contact Zb is drawn up so that because contact Rc of the retarding relay R is also closed, the electro valve $V_2$ is supplied with potential, so that the path for the pressure air is opened through the valve $V_2$ and the container is likewise moved downwardly. After an exactly predetermined time period the time switch Z disconnects, which results in releasing its self-holding contact Za and also its contact Zb.

Having now described my invention with reference to the embodiment illustrated in the drawings, I do not witsh to be limited thereto but what I desire to protect by Letters Patent of the United States is described herein.

I claim:
1. A feeding device for machine tools for feeding blanks to be processed from a supply container releasing a blank for each operation, said device comprising a plate disposed in inclined position relative to the vertical, a container slidable on said plate for varying the elevation of the container, said plate forming one longitudinal wall of said container and having proximate the upper end of the path of travel of said container an aperture defining a discharge opening for work blanks, and pressure piston means for moving said container on said plate relative to said aperture, and a lug pivotally mounted on the side of said plate remote from said container having an abutment defining together with the walls defining said aperture in said plate a supply chamber for one work blank at a time, means for varying the volume accommodation of said chamber including means for adjusting the position of said abutment and means for adjusting the width of said aperture.

2. A feeding device for machine tools for feeding blanks to be processed from a supply container releasing a blank for each operation, said device comprising a plate disposed in inclined position relative to the vertical, a container slidable on said plate for varying the elevation of the container, said plate forming one longitudinal wall of said container and having proximate the upper end of the path of travel of said container an aperture defining a discharge opening for work blanks, and pressure piston means for moving said container on said plate relative to said aperture, and a lug pivotally mounted on the side of said plate remote from said container having an abutment defining together with the walls defining said aperture in said plate a supply chamber for one work blank at a time, means for varying the volume accommodation of said chamber including means for adjusting the position of said abutment and means for adjusting the width of said aperture, said device further including a plunger disposed above said aperture on said plate, an end switch mounted in operative relationship to said plunger and adapted to control the said pressure piston means whereby movement of said plunger upon being contacted by blanks in said container actuates said end switch and thereby limits the upward movement of said pressure piston means and of said container.

References Cited by the Examiner
UNITED STATES PATENTS

| | | | |
|---|---|---|---|
| 607,537 | 7/98 | Benjamin | 221—241 |
| 792,650 | 6/05 | Cordes | 221—174 |
| 1,281,410 | 10/18 | Miller | 221—187 |
| 2,278,140 | 3/42 | Sieger | 221—279 |
| 2,372,647 | 4/45 | Beane | 221—279 |
| 2,571,576 | 10/51 | Hopkins et al. | 221—175 |
| 3,018,001 | 1/62 | Combs | 221—242 |

RAPHAEL M. LUPO, *Primary Examiner.*

LOUIS J. DEMBO, *Examiner.*